United States Patent
Takeya

(10) Patent No.: US 6,301,201 B1
(45) Date of Patent: Oct. 9, 2001

(54) READING APPARATUS FOR OPTICAL RECORDING MEDIUM

(75) Inventor: Noriyoshi Takeya, Asaka (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/350,078

(22) Filed: Jul. 8, 1999

(30) Foreign Application Priority Data

Jul. 10, 1998 (JP) .................................................. 10-211798

(51) Int. Cl.$^7$ .................................................. G11B 17/22
(52) U.S. Cl. .................................................. 369/32
(58) Field of Search .................................. 369/32, 44.28, 369/44.27, 44.29, 44.34, 44.35

(56) References Cited

U.S. PATENT DOCUMENTS

| | | |
|---|---|---|
| 4,866,687 * | 9/1989 | Kasai et al. .............................. 369/32 |
| 5,307,333 | 4/1994 | Ikeda et al. . |
| 5,490,127 * | 2/1996 | Ohta et al. ............................ 369/116 |
| 5,841,739 * | 11/1998 | Iida et al. ................................ 369/32 |
| 6,118,746 * | 9/2000 | Verboom ................................ 369/59 |
| 6,188,654 * | 2/2001 | Kaku et al. ............................. 369/47 |

FOREIGN PATENT DOCUMENTS

| | | |
|---|---|---|
| 0 363 022 | 4/1990 | (EP) . |
| 0 487 321 | 5/1992 | (EP) . |

* cited by examiner

Primary Examiner—Tan Dinh
(74) Attorney, Agent, or Firm—Anderson, Kill & Olick, P.C.

(57) ABSTRACT

When a disc 1 is loaded, a focus serve is closed so as to focalize a light beam of the pick up 3 to the disc 1. The disc 1 is rotated by the spindle motor 2 by way of the driver 28. An upper limit value RFt of a slice level is measured in accordance with cross talk of an RF signal, which is read out from a signal recording area of the disc 1, and a lower limit value RFb of a slice level is measured. A slice level Th is calculated in accordance with an equation: Th=(RFt−RFb)/2, then the slice level Th is stored in the memory 135 and is set in the track counting section 120 while image searching.

7 Claims, 18 Drawing Sheets

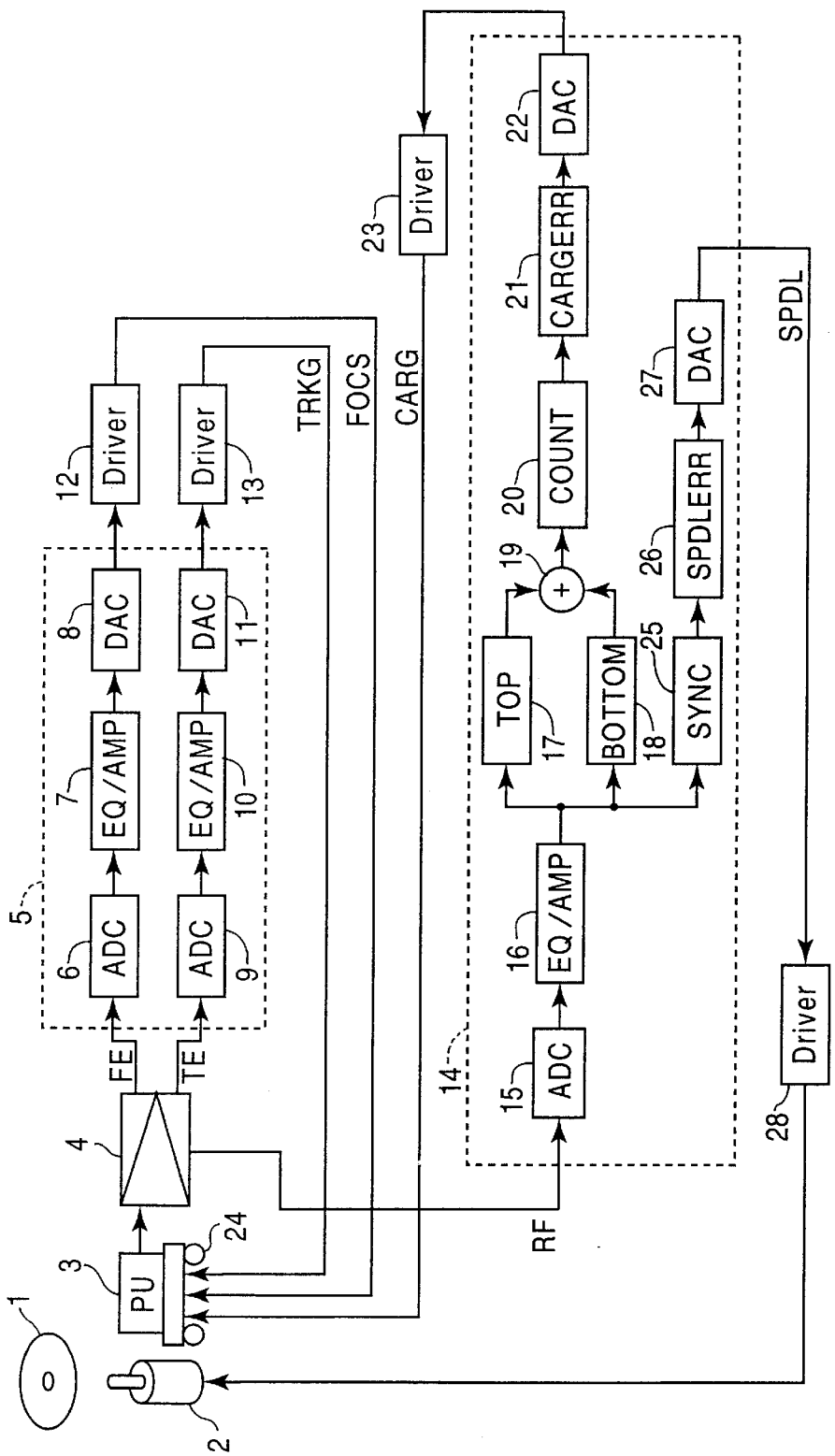
*Fig. 1* COMPARATIVE EXAMPLE

READING APPARATUS FOR OPTICAL RECORDING MEDIUM

BACKGROUND OF THE INVENTION

1. Field of the Invention

The present invention relates to a reading apparatus for optical recording medium recorded with optical information, particularly, relates to a reading apparatus of counting a number of tracks in response to a slice level of cross talk of RF (Radio Frequency) signals recorded in an optical recording medium while a special reproduction such as high speed image searching.

2. Description of the Related Art

Generally, while an optical disc is reproduced or recorded, some methods such as a method based upon a tracking error signal and a method based upon an RF (Radio Frequency) signal are well known as a method of counting a number of tracks while a special reproduction such as high speed image searching. In case of a method of counting a number of tracks based upon an RF signal, a signal for counting is produced by holding and detecting a top and a bottom levels of an RF signal by a predetermined time constant, then a number of tracks is counted after the top and the bottom levels are sliced by a predetermined slice level. In case of a system of processing various signals obtained by a pickup after the various signals are converted into digital, for example, in case of a system using a 5 volt single power supply, a reference voltage is set up to 2.5V for instance and a signal for counting is adapted with centering the reference voltage, then the signal for counting is digitized.

Since a signal for counting, which is produced by holding and detecting a top and a bottom levels of an RF signal as mentioned above, has amplitude of centering a certain value, a certain value can be proper for a slice level as long as optical dispersion of a pickup is low and difference in cross talk of disc by disc is small, wherein the cross talk value is a range of fluctuation of a scanning signal, which is obtained by scanning or reproducing a disc with one rotation in a circumference direction. Further, in case that a center of a signal for counting is fluctuated, the fluctuation can be absorbed by applying an AC (Alternative Current) coupling when a signal for counting produced in analog is supplied to a digital signal processing block as long as image searching is not performed at a high speed.

FIG. 1 shows a reproduction apparatus or a reading apparatus of a comparative example. In FIG. 1, a disc 1 is a CD (Compact Disc) for instance and is rotated by a spindle motor 2. Information recorded in the disc 1 are read out by a pick up (PU) 3 as a signal. A preamplifier 4 produces an RF signal, a tracking error (TE) signal, and a focus error (FE) signal in accordance with the signal read out by the PU 3. The FE and the TE signals are supplied to a driver circuit 12 for driving a focus coil and a driver circuit 13 for driving a tracking coil by way of analog to digital converters (ADC) 6 and 9, equalizer and amplifier (EQ/AMP) 7 and 10, and digital to analog converters (DAC) 8 and 11 in a servo amplifier section 5 respectively. The driver circuits 12 and 13 drive a focus coil and a tracking coil with a tracking drive signal (TRKG) and a focus drive signal (FOCS) respectively, wherein the focus coil and the tracking coil are not shown in FIG. 1.

The RF signal produced by the preamplifier 4 is supplied to a top detector (TOP) 17, a bottom detector (BTOM) 18, and a synchronous detecting circuit (SYNC) 25 respectively by way of an ADC 15 and an EQ/AMP 16 in a decoder section 14. The SYNC 25 produces a synchronous signal in accordance with the RF signal. A spindle error (SPDLERR) circuit 26 produces a spindle error (SPDL) signal in accordance with the synchronous signal, then the SPDL signal is supplied to a driver circuit 28 by way of a DAC 27. The driver circuit 28 drives the spindle motor 2 in response to the SPDL signal.

The TOP 17 and the BTOM 18 produce a top envelope signal and a bottom envelope signal of the RF signal respectively. These two envelope signals are added by an adder 19 and a signal having amplitude by track cross is produced, wherein the track cross is produced by the top and the bottom envelopes of the RF signal. The signal is sliced with a certain slice level and counted by a track counting section (COUNT) 20 while high speed image searching. A carriage error signal is produced in a carriage error circuit (CARGERR) 21 in accordance with a value of track count and is supplied to a driver circuit 23 through a DAC 22. The driver circuit 23 drives a carriage motor 24 with a carriage drive signal (CARG) in response to the carriage error signal.

In addition thereto, the TOP 17 and the BTOM 18 are arranged in a subsequent stage of the ADC 15 and the EQ/AMP 16 in FIG. 1. However, it is known that an RF signal in analog produced by the preamplifier 4 can be directly supplied to the TOP 17 and the BTOM 18 and the signal having amplitude of track cross is converted from analog to digital in between the adder 19 and the COUT 20 by the AC coupling.

In case that a plurality of data are sequentially wrote down in one CD-R (Compact Disc Recordable) by a plurality of writing apparatuses having respective pick up of optically various characteristics, there existed some problems such that a number of tracks can not be accurately counted since a value of cross talk varies by area written with information. Further, since high speed disc rotation and high speed image searching are required for a CD-ROM (Compact Disc Read Only Memory) recently, a high frequency component decreases by the AC coupling of signals for counting and a problem such that a number of track can not be accurately counted arises.

Main waveforms in process of the comparative example are depicted in FIGS. 2(a) through 2(d). In case that a tracking servo is in an open loop state, an RF signal in analog produced by the preamplifier 4 contains an amplitude component in a lower part of a waveform as shown in FIG. 2(a) due to an eccentric component of the disc 1. With assuming that a peak to peak level of RF signal is 2.0 $V_{p-p}$ and a lower amplitude component by an eccentric component is 0.5 $V_{p-p}$, a value of cross talk is as follows:

$$(2.0-0.5) \times 100/2.0 = 75[\%]$$

A top envelope signal, which is hereinafter called a top component, and a bottom envelope signal, which is hereinafter called a bottom component, respectively produce by the TOP 17 and the BTOM 18 in accordance with the RF signal, are shown in FIG. 2(b) as analog signals for easier explanation. An amplitude component by an eccentric component is extracted as shown in FIG. 2(c) by adding or subtracting these two signals in the adder 19.

In case that a reference voltage of a signal inputted to the preamplifier 4 is 2.5V and an average value of an RF signal produced by the preamplifier 4 is the same voltage as that of the reference voltage as shown in FIG. 2(a), a top component is approximately 3.5V and a bottom component has a voltage range from 1.5V to 2.0V approximately, that is, an average value of the bottom component is 1.75V as shown in FIG. 2(b) as long as a time constant held by the ADC 15 is fast. If the reference voltage is assumed to be 0V, the top component is approximately 1.0V and the bottom component is approximately from −0.5V to −1.0V.

Then a sum of the top component and the bottom component is obtained. A summed signal as shown in FIG. 2(c) is as follows:

Upper limit value=(3.5−2.5)+(2.0−2.5)=0.5[V], where the value 0.5V is a value based upon the reference voltage of 2.5V, that is, the upper limit value 0.5V is equivalent to 3.0V, which is higher than the reference voltage of 2.5V by 0.5V.

Lower limit value=(3.5−2.5)+(1.5−2.5)=0[V], where the value 0V is a value based upon the reference voltage of 2.5V, that is, the lower limit value 0V is equivalent to the reference voltage of 2.5V. Therefore, the amplitude of the summed signal is from 0.5V to 0V if the reference voltage of 2.5V is assumed to be 0V. Accordingly, in case that a track count is performed while high speed image searching in accordance with the waveform for counting, a slice level is preferable to be 0.25V, which is an average value of the amplitude from 0.5V to 0V. In other words, the slice level shall be 2.75V, which is higher than the reference level of 2.5V by 0.25V.

However, since actual cross talk of an RF signal is fluctuated by uneven surface flatness or eccentricity of the disc 1, a lower amplitude component is disturbed as shown in FIG. 2(d). Therefore, there existed a problem that a track counting is not accurately performed with the above mentioned slice level.

SUMMARY OF THE INVENTION

Accordingly, in consideration of above mentioned problems of the comparative example, an object of the present invention is to provide a reading apparatus for optical recording medium, which can perform a track counting accurately although cross talk of an RF signal fluctuates when a track is counted in accordance with an RF signal read out from a signal recording area of an optical recording medium and with a predetermined slice level while a special reproduction such as high speed image searching.

In order to achieve the above object, the present invention provides, according to an aspect thereof, a reading apparatus for optical recording medium in which a slice level is calculated and set up in accordance with a value of cross talk of an RF signal.

According to the aspect of the present invention, there provided a reading apparatus for optical recording medium, which comprises track counting means for counting a number of signals crossing a slice level as a number of tracks, wherein the signals are an added signal or a subtracted signal of a top envelope and a bottom envelope of an RF signal read out from a signal recording area of the optical recording medium while image searching, and slice level calculating means for detecting an upper limit level and a lower limit level of the added signal or the subtracted signal obtained by scanning a circumference direction of the signal recording area, for holding the upper limit level and the lower limit level of the added signal or the subtracted signal detected, and for calculating an average of the upper limit level and the lower limit level as the slice level.

Other object and further features of the present invention will be apparent from the following detailed description when read in conjunction with the accompanying drawings.

BRIEF DESCRIPTION OF DRAWINGS

FIG. 1 shows a block diagram of a reading apparatus for an optical recording nedium according to a comparative example.

FIG. 2(*b*) shows waveforms of a top envelope and a bottom envelop according the comparative example.

FIG. 2(*c*) shows a waveform of seek counting, wherein a signal for counting is properly arranged in design specification according to the comparative example.

FIG. 2(*d*) shows a waveform of seek counting, wherein a signal for counting is arranged out of design specification, that is, a slice level is not optimum for the signal for counting according to the comparative example.

FIG. 4(*b*) shows waveforms of a top envelope and a bottom envelop in the reading apparatus shown in FIG. 3 according to the first embodiment of the present invention.

FIG. 4(*c*) shows a method of setting an upper slice level for seek counting in the reading apparatus shown in FIG. 3 according to the first embodiment of the present invention.

FIG. 4(*d*) shows a waveform of seek counting, which is produced by slicing the signal for counting, in the reading apparatus shown in FIG. 3 according to the first embodiment of the present invention.

FIG. 8(*b*) shows waveforms of a top envelope and a bottom envelop in the reading apparatus according to the second embodiment of the present invention.

FIG. 8(*c*) shows a method of setting an upper slice level for seek counting in the reading apparatus according to the second embodiment of the present invention.

FIG. 8(*d*) shows a waveform of seek counting in the reading apparatus according to the second embodiment of the present invention.

DETAILED DESCRIPTION OF THE PREFERRED EMBODIMENTS

First Embodiment

Figure 2A:
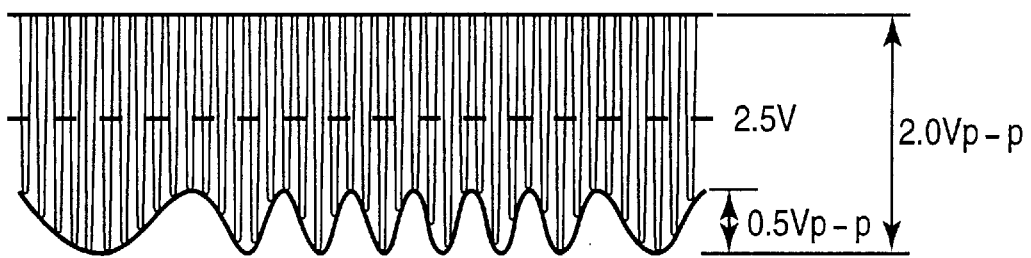
FIG. 2(*a*) shows a waveform of RF signal when tracking servo is in an open state according to the comparative example.
Figure 2B:
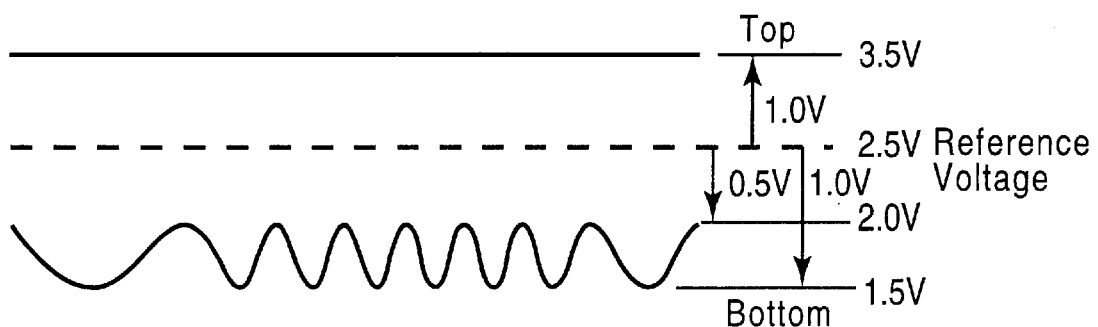
Figure 2C:
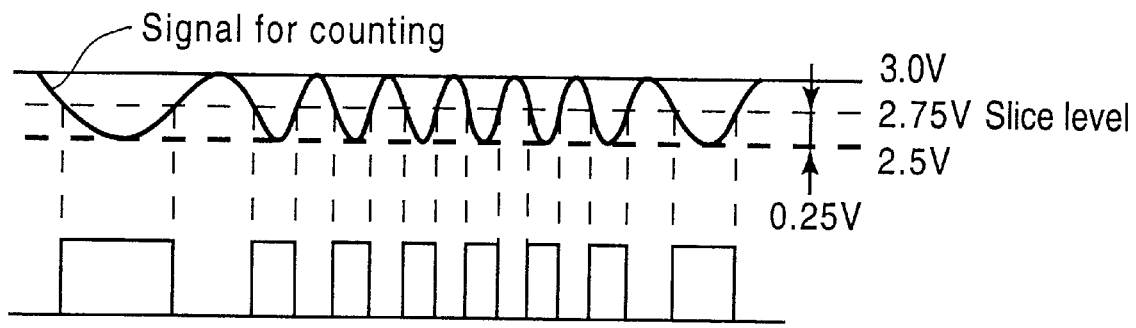
Figure 2D:
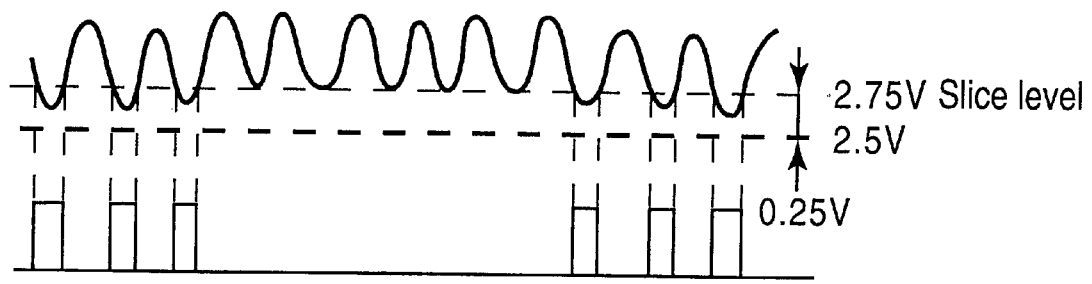
Figure 3:
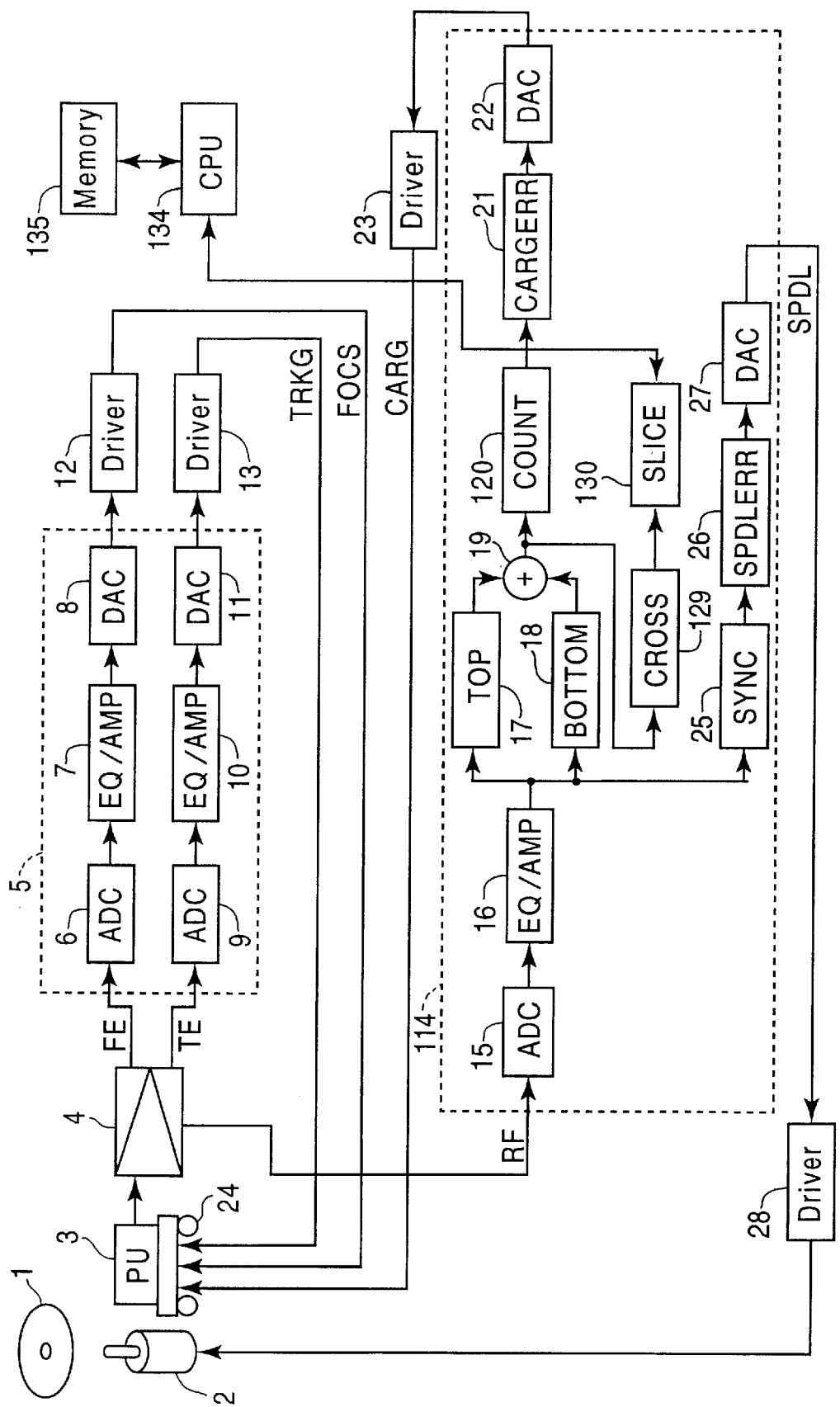
FIG. 3 shows a block diagram of a reading apparatus for an optical recording medium according to a first embodiment of the present invention.

FIG. 3 is a block diagram of a reading apparatus for an optical recording medium according to a first embodiment of the present invention.

FIGS. 4(a) through 4(d) are waveforms of main signals in the block diagram of the reading apparatus shown in FIG. 3 according to the first embodiment of the present invention.

Figure 5:
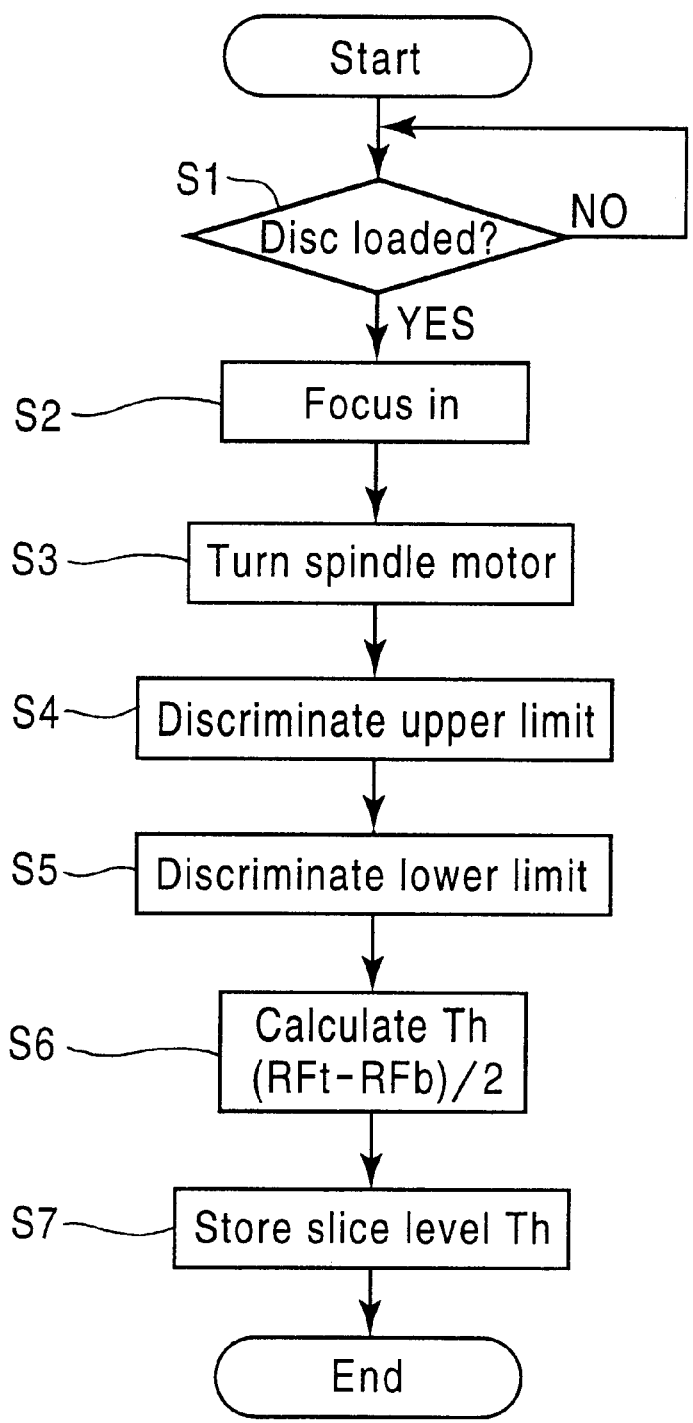
FIG. 5 shows a flow chart of explaining a process of setting a slice level according to the first embodiment of the present invention.

FIG. 5 is a flow chart of explaining a process of setting a slice level according to the first embodiment of the present invention.

Figure 6:
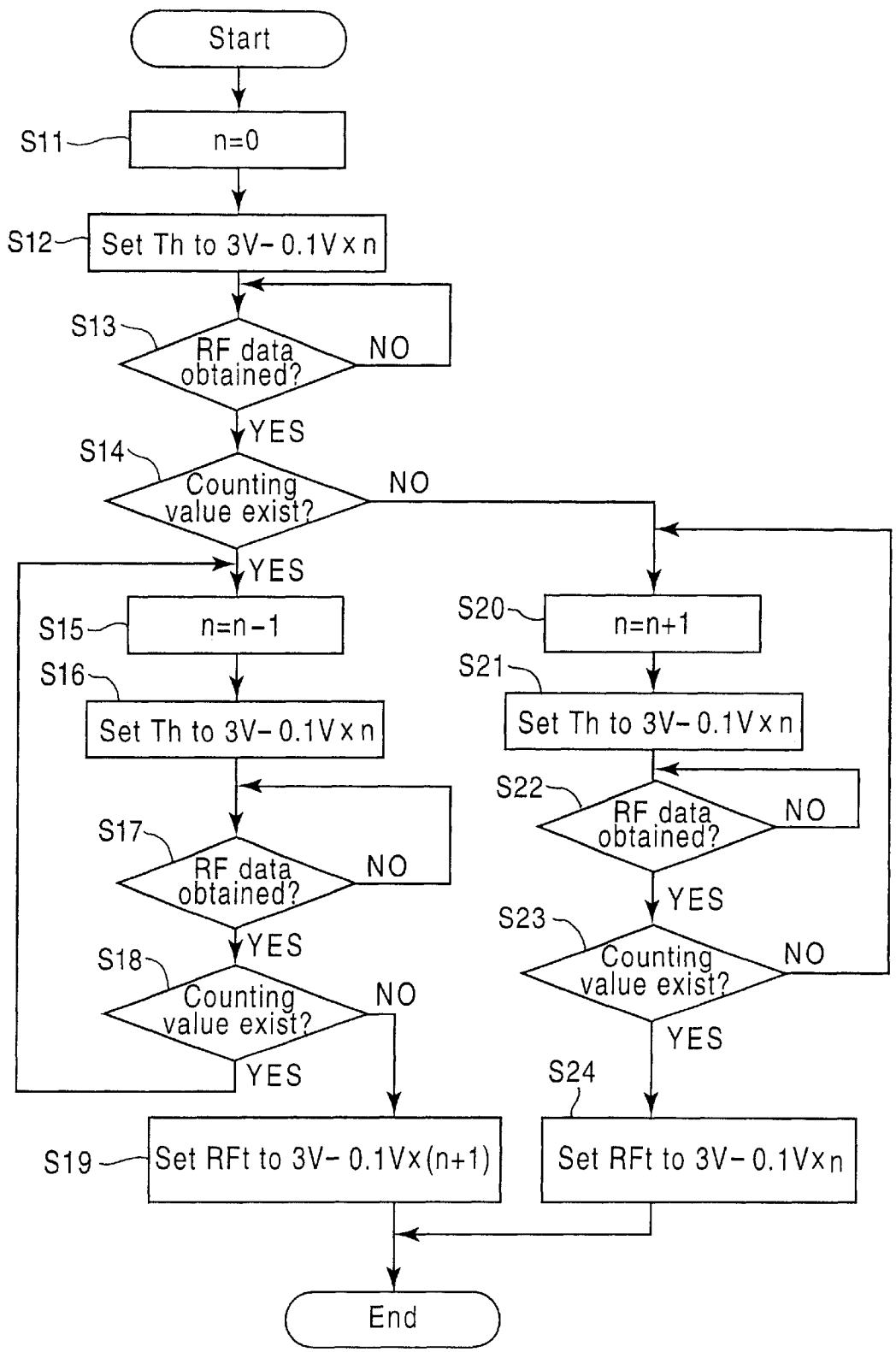
FIG. 6 shows a block diagram of depicting a process of discriminating an upper limit level shown in FIG. 5.

FIG. 6 is a block diagram of depicting a process of discriminating an upper limit level shown in FIG. 5.

Figure 7:
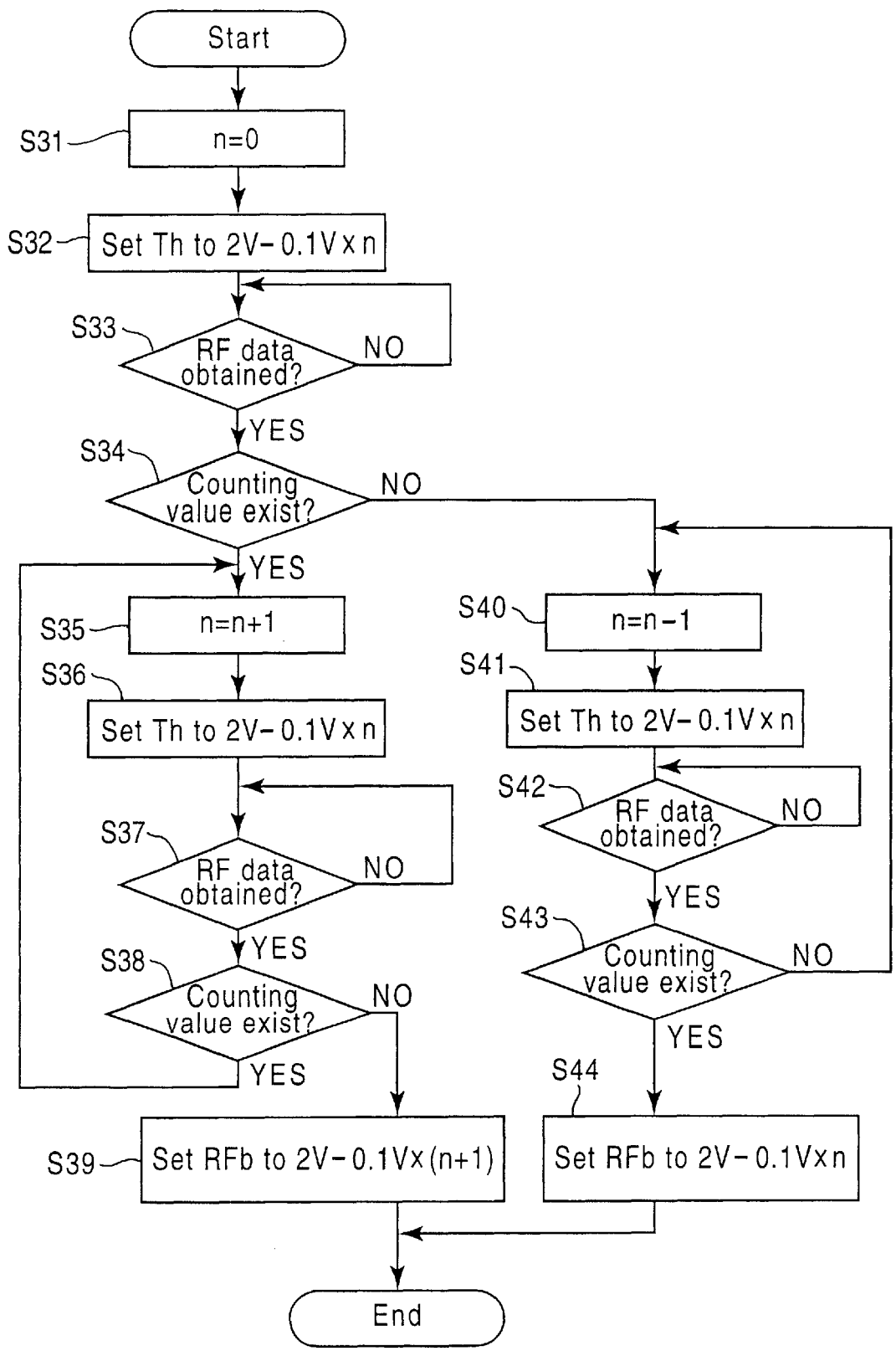
FIG. 7 shows a flow chart of depicting a process of discriminating a lower limit level shown in FIG. 5.

FIG. 7 is a flow chart of depicting a process of discriminating a lower limit level shown in FIG. 5.

As shown in FIG. 3, a reading apparatus comprises a disc 1 such as a compact disc (CD), a spindle motor 2, a pick up (PU) 3 including a carriage motor 24 and a focus and a tracking coils, which are not shown in FIG. 3, a preamplifier 4, a servo amplifier section 5 composed of analog to digital converters (ADC) 6 and 9, a equalizer and amplifier (EQ/AMP) 7 and 10, and digital to analog converters (DAC) 8 and 11, and further comprises four drivers 12, 13, 23, and 28, a memory 135, a CPU 134, and a decoder section 114. The decoder section 114 furthermore comprises a DAC 15, an EQ/AMP 16, a top detector (TOP) 17, a bottom detector (BTOM) 18, an adder 19, a track counting section (COUNT) 120, a carriage error circuit (CARGERR) 21, two DAC 22 and 27, a synchronous detecting circuit (SYNC) 25, a spindle error circuit (SPDLERR) 26, a cross talk detector (CROSS) 129, and a slice level control circuit (SLICE) 130.

In FIG. 3, the disc 1 is a CD (Compact Disc) for instance and is rotated by the spindle motor 2. Information recorded in the disc 1 are read out by the pick up (PU) 3 as a signal. The preamplifier 4 produces an RF signal, a focus error (FE) signal, and a tracking error (TE) signal in accordance with the signal read out by the PU 3. The FE and the TE signals are supplied to the driver circuit 12 for driving a focus coil and the driver circuit 13 for driving a tracking coil by way of the ADC 6 and 9, the EQ/AMP 7 and 10, and the DAC 8 and 11 in the servo amplifier section 5 respectively. The driver circuits 12 and 13 drive a focus coil and a tracking coil with a tracking drive signal (TRKG) and a focus drive signal (FOCS) respectively, wherein the focus coil and the tracking coil are not shown in FIG. 3.

The RF signal produced by the preamplifier 4 is supplied to the TOP 17, the BTOM 18, and the SYNC 25 respectively by way of the ADC 15 and the EQ/AMP 16 in the decoder section 114. The SYNC 25 produces a synchronous signal in accordance with the RF signal. The SPDLERR 26 produces a spindle error (SPDL) signal in accordance with the synchronous signal, and then the SPDL signal is supplied to the driver circuit 28 by way of the DAC 27. The driver circuit 28 drives the spindle motor 2 in response to the SPDL signal.

The TOP 17 and the BTOM 18 produce a top envelope signal and a bottom envelope signal of the RF signal respectively. These two envelope signals are added by the adder 19 and a signal having amplitude by track cross is produced, wherein the track cross is produced by the top or upper and the bottom or lower envelopes of the RF signal. The signal is sliced with a certain slice level and counted by the COUNT 120 while a special reproduction such as high speed image searching. A carriage error signal is produced in the CARGERR 21 in accordance with a value of track count and is supplied to the driver circuit 23 through the DAC 22. The driver circuit 23 drives the carriage motor 24 with a carriage drive signal (CARG) in response to the carriage error signal. The signal produced by the adder 19 is supplied to the CROSS 129 and the CROSS 129 detects cross talk. The detected cross talk is processed by the SLICE 130 in order to search an upper limit level and a lower limit level. The upper and the lower limit levels are transferred to the CPU 134 and stored in the memory 135 and also they are transferred to the COUNT 120 in order to control a slice level for counting a number of tracks. In addition thereto, the CPU 134 controls the SLICE 130.

Figure 4A:
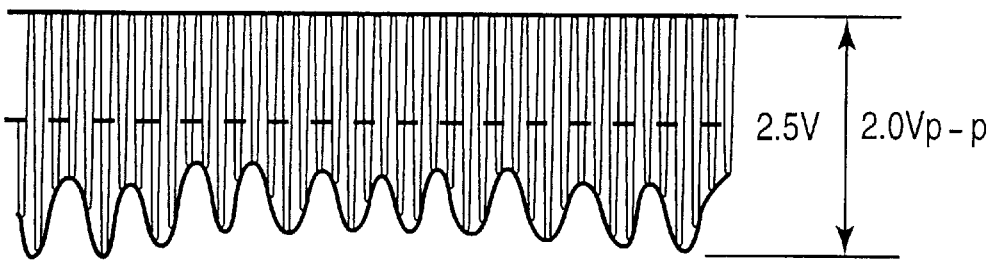
FIG. 4(*a*) shows a waveform of RF signal when a tracking servo is in an open state in the reading apparatus shown in FIG. 3 according to the first embodiment of the present invention.
Figure 4B:
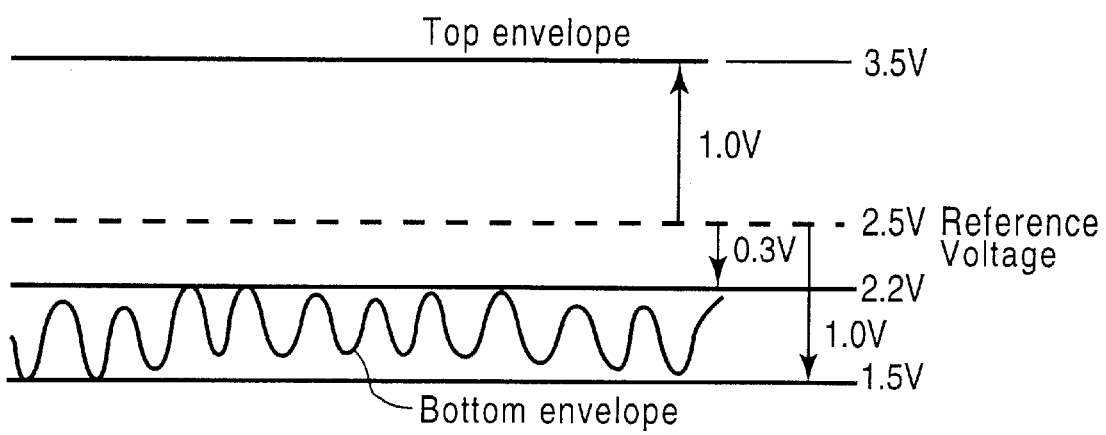

The RF signal produced by the preamplifier 4 includes an amplitude component such as a lower part of the signal as shown in FIG. 4(a) by an eccentric component of the disc 1. In the TOP 17 and the BTOM 18, a top envelope signal, which is hereinafter called a top component, and a bottom envelope signal, which is hereinafter called a bottom component, of the RF signal are produced as shown in FIG. 4(b). In case that a reference voltage of the RF signal inputted to the preamplifier 4 is 2.5V and an average value of the RF signal produced by the preamplifier 4 is the reference voltage, the top component is approximately 3.5V and the bottom component is approximately between 1.5V and 2.2V as shown in FIG. 4(b) as long as a time constant held by the ADC 15 is fast. Further, the top component becomes approximately 1.0V and the bottom component becomes approximately between −0.3V and −1.0V if the reference voltage is assumed to be 0V.

Figure 4C:
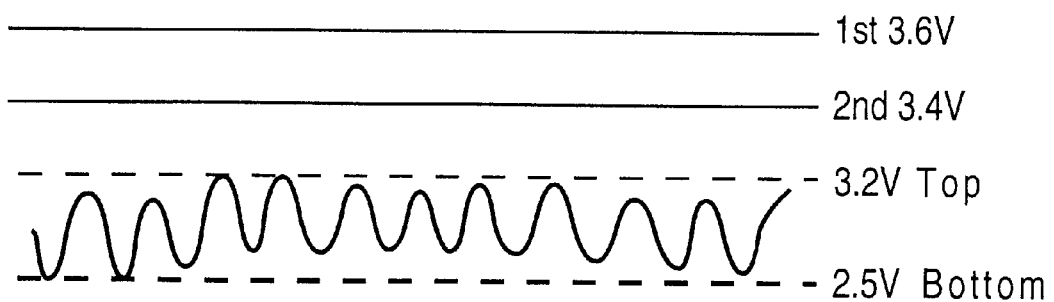

A method of searching an upper limit value is depicted in FIG. 4(c). In FIG. 4(c), a sum of the top and the bottom components is sliced by a first slice level of 3.6V, for instance. However, the first slice level is too high to count a number of tracks. Then the sum of the top and the bottom components is sliced by a second slice level of 3.4V. However, the second slice level is still too high to count a number of tracks. Accordingly a slice level is gradually decreased from a higher level to a lower level in order to seek an upper limit value of the sum of the upper and the bottom components.

When the adder 19 obtains a sum of the top component and the bottom component, a summed signal, that is, an added signal is obtained as follows, as shown in FIG. 4(c).

Upper limit value =(3.5−2.5)+(2.2−2.5)=0.7[V], where the value of 0.7V is a relative value based upon the reference voltage of 2.5V, in other words, the upper limit value of 3.2V is higher than the reference voltage of 2.5V by 0.7V.

Lower limit value=(3.5−2.5)+(1.5−2.5)=0[V], where the value of 0V is a relative value based upon the reference voltage of 2.5V, that is, the lower limit value is equivalent to the reference voltage. Amplitude of the added signal becomes from 0.7V to 0V if the reference voltage 2.5V is assumed as 0V. Accordingly, when a track counting is performed in accordance with a waveform for track counting while image searching, a slice level is preferable to be 0.35V higher than the reference level 2.5V, wherein 0.35V is an average value of amplitude from 0.7V to 0V.

Figure 4D:
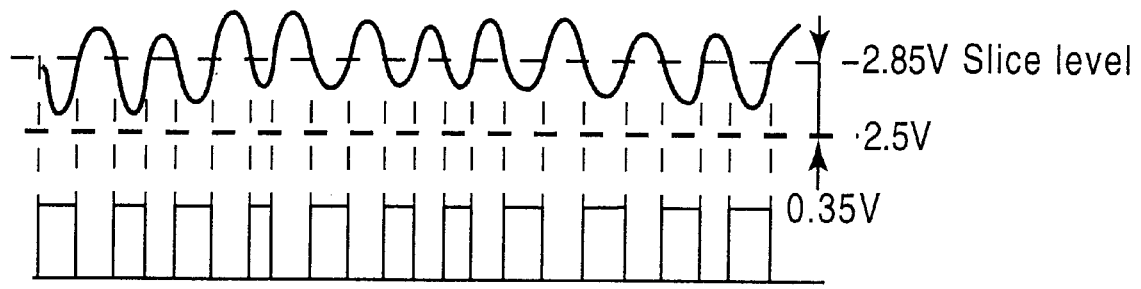

Accordingly, the signal for counting is sliced by the slice level of 2.85V, which is higher than the reference voltage of 2.5V by 0.35V, as shown in FIG. 4(d). Pulses produced by slicing the signal for counting are obtained and a number of pulses is counted by the COUNT (track counting section) 120 as a number of tracks.

Prior to counting a number of tracks by the COUNT 120 while image searching, a signal added by the adder 19 is supplied to the CROSS (cross talk detector) 129 and a cross talk signal, that is, an added signal, which is obtained by scanning the disc 1 in a circumference direction by one rotation, is detected. The SLICE (slice level control circuit) 130 searches an upper limit level RFt=0.7V and a lower limit level RFb=0V by steps shown in FIGS. 5, 6 and 7 and makes the memory 135 store an average value of the RFt and the RFb as a slice level Th through the CPU 134. The upper limit value RFt and the lower limit value RFb are held or memorized in the memory 135. The slice level Th is set in the COUNT 120 while image searching. Accordingly, the COUNT 120 counts a number of crossing points of a signal for counting, which crosses the slice level Th as shown in FIG. 4(d), as a number of tracks.

A process of the counting is depicted as follows with referring FIGS. 5, 6 and 7. As shown in FIG. 5, it is confirmed whether or not a disc 1 is loaded (step S1). In case that a disc is loaded, a focus servo is closed, that is, FOCUS IN, in order to focalize a light beam of the PU (pick up) 3 into the disc 1 (step S2), then the spindle motor 2 for turning the disc 1 is rotated by way of the driver 28 (step S3). An upper limit level RFt of a slice level is discriminated in accordance with cross talk of an RF signal, which is read out from a signal recording area of the disc 1, as depicted in FIG. 6 (step S4). A lower limit level RFb of the slice level is discriminated as depicted in FIG. 7 (step S5). A slice level Th is calculated by an equation as shown bellow (step S6):

$Th=(RFt-RFb)/2$

The slice level Th is stored in the memory 135 (step S7) and the process comes to end.

A process of obtaining the upper limit level RFt and the lower limit level RFb of the slice level is depicted with referring FIGS. 6 and 7. In FIG. 6, a value "n" is set to zero (step S11), then the upper limit level RFt, that is, RFt=3V−0.1V×n, is set in the COUNT 120 as a slice level (step S12). In this case, RFt=3V, since the "n" is zero. It is judged whether or not RF data for one circular of the disc 1 are obtained (step S13), then it is judged whether or not a counting value exists with slicing a signal for counting at Th=3V in the COUNT 120 (step S14), wherein a counting value is not equal to zero (≠0) if a counting value is existed, and is equal to zero (=0) if a counting value is not existed.

In case that a counting value is existed, the value "n" is set to n=n−1 so as to increase the upper limit level RFt (step S15), since the upper limit of the signal for counting exceeds 3V. The upper limit level RFt, that is, RFt=3V−0.1V×n is set in the COUNT 120 as a slice level Th (step S16). In this case, "n" is equal to−1. Therefore, the Th becomes 3.1V. It is judged whether or not RF data for one circular of the disc 1 are obtained (step S17), then it is judged whether or not a counting value is existed with slicing a signal for counting at Th=3.1V in the COUNT 120 (step S18), wherein a counting value is not equal to zero (≠0) if a counting value is existed, or is equal to zero (=0) if a counting value is not existed. In case that a counting value is existed, the step returns back to the step S15 and the same process will be repeated. In case that a counting value is no more existed in the step S18, the process is forwarded to a step S19. In the step S19, an upper limit level RFt of the slice level Th is set to RFt=3V−0.1V×(n+1) and it is stored in the memory 135, and the process comes to end.

Further, since the upper limit level of the signal for counting is less than 3V if a counting value is not existed at Th=3V in the step S14, the value "n" is set to n=n+1 so as to decrease the slice level Th (step S20). The upper limit level RFt, that is, RFt=3V−0.1V×n is set in the COUNT 120 as a slice level Th (step S21). In this case, the Th becomes 2.9V since the "n" is equal to one. It is judged whether or not RF data for one circular of the disc 1 are obtained (step S22), then it is judged whether or not a counting value exists with slicing a signal for counting at Th=2.9V in the COUNT 120 (step S23), wherein a counting value is not equal to zero (≠0) if a counting value is existed, or is equal to zero (=0) if a counting value is not existed. In case that a counting value is no more existed in the step S23, the process returns back to the step S20 and the process is repeated. In case that a counting value is existed in the step S23, the process is forwarded to the step S24, an upper limit level RFt of the slice level Th, that is, RFt=3V−0.1V×n is set and stored in the memory 135, then the process comes to end.

In FIG. 7, a value "n" is set to zero (step S31). A lower limit level RFb, that is, RFt=2V−0.1V×n is set in the COUNT 120 as a slice level Th (step S32). In this case, the Th becomes 2V since the "n" is equal to zero. It is judged whether or not RF data for one circular of the disc 1 are obtained (step S33), then it is judged whether or not a counting value exists with slicing a signal for counting at Th=2V in the COUNT 120 (step S34), wherein a counting value is not equal to zero (≠0) if a counting value is existed, or is equal to zero (=0) if a counting value is not existed.

In case that a counting value is existed at 2V, the value "n" is set to n=n+1 so as to decrease the lower limit level RFb (step S35), since the lower limit of the signal for counting exceeds 2V. The lower limit level RFb is set in the COUNT 120 as a slice level Th=2V−0.1V×n (step S36). In this case, "n" is equal to one. Therefore, the Th becomes 1.9V. It is judged whether or not RF data for one circular of the disc 1 are obtained (step S37), then it is judged whether or not a counting value exists with slicing a signal for counting at Th=1.9V in the COUNT 120 (step S38), wherein a counting value is not equal to zero (≠0) if a counting value is existed, or is equal to zero (=0) if a counting value is not existed. In case that a counting value is existed, the step returns back to the step S35 and the same process will be repeated. In case that a counting value is no more existed in the step S38, the process is forwarded to a step S39. In the step S39, an lower limit level RFb of the slice level Th is set to RFb=2V−0.1V×(n+1) and it is stored in the memory 135, and the process comes to end.

Further, since the lower limit level of the signal for counting is less than 2V if a counting value is not existed at Th=2V in the step S34, the value "n" is set to n=n−1 so as to increase the slide level Th (step S40). The lower limit level RFb, that is, RFb=2V−0.1V×n is set in the COUNT 120 as a slide level Th (step S41). In this case, the Th becomes 2.1V since the "n" is equal to one. It is judged whether or not RF data for one circular of the disc 1 are obtained (step S42), then it is judged whether or not a counting value exists with slicing a signal for counting at Th=2.1V in the COUNT 120 (step S43), wherein a counting value is not equal to zero (≠0) if a counting value is existed, or is equal to zero (=0) if a counting value is not existed. In case that a counting value is no more existed in the step S43, the process returns back to the step S40 and the process is repeated. In case that a counting value is existed in the step S43, the process is forwarded to a step S44, a lower limit level RFb of the slice level Th, that is, RFb=2V−0.1V×n is set and stored in the memory 135, then the process comes to end.

Accordingly, since a slice level Th is set in accordance with an upper limit level RFt and a lower limit level RFb of an added signal as shown in FIGS. 4(c) and 4(d), track counting is accurately performed by the above mentioned embodiment of the present invention although cross talk of an RF signal is fluctuated. In addition thereto, in the above mentioned embodiment, a slice level Th is only stored in the memory 135. However, the above mentioned process is not necessary to perform at each time when a disc is loaded if the process is performed at a first time when the disc is loaded as long as the slice level Th is stored in the memory 135 in conjunction with inherent information to a disc such as TOC (Table Of Contents) information. It is also acceptable that the above mentioned process is performed at every time when a disc is loaded.

Second Embodiment

FIGS. 8(a) through 8(d) are exemplary waveforms according to a second embodiment of the present invention.

Figure 9:
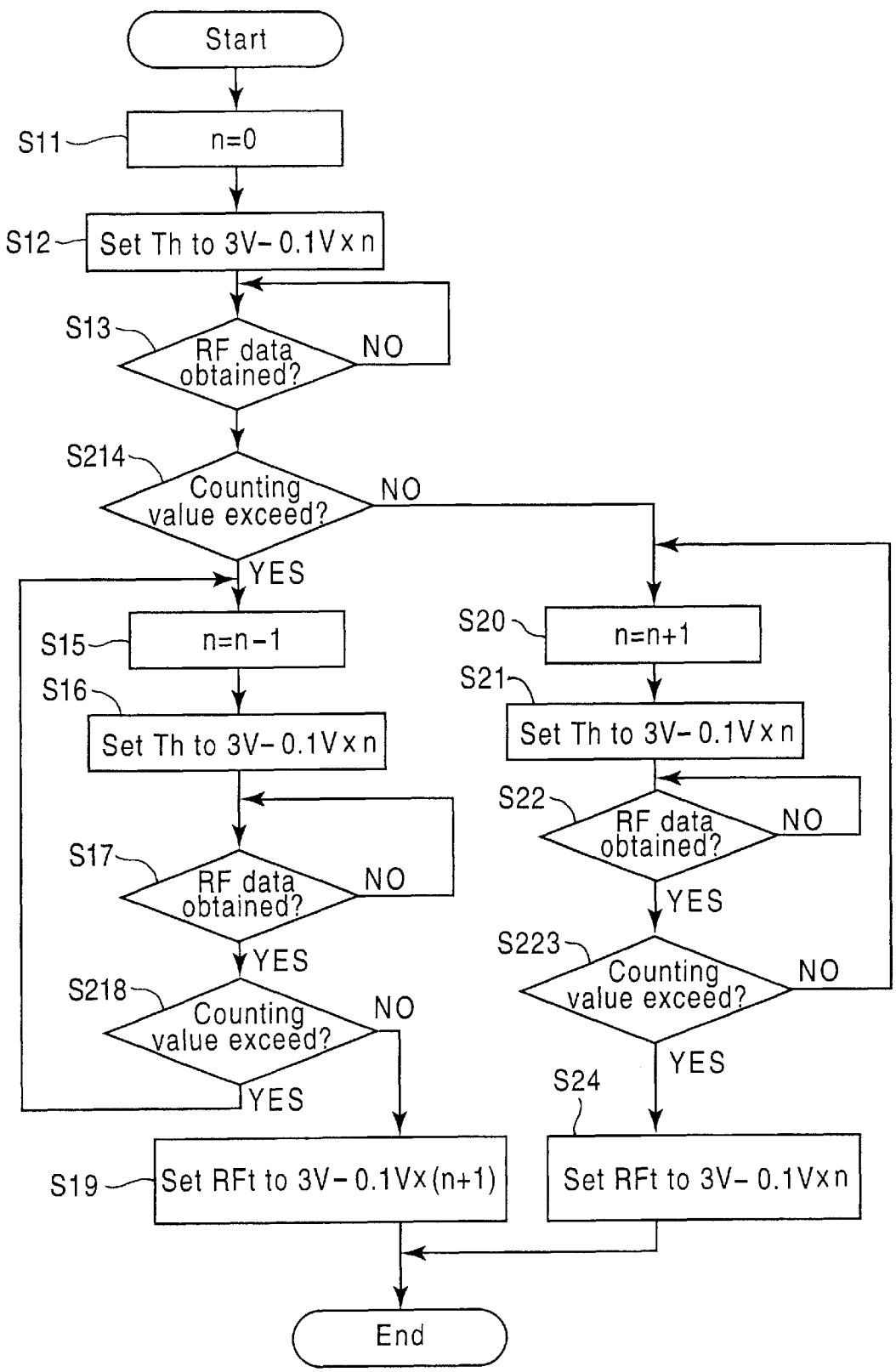
FIG. 9 shows a flow chart of depicting a process of discriminating an upper limit level according to the second embodiment of the present invention.

FIG. 9 is a flow chart of depicting a process of discriminating an upper limit level according to the second embodiment of the present invention.

Figure 10:
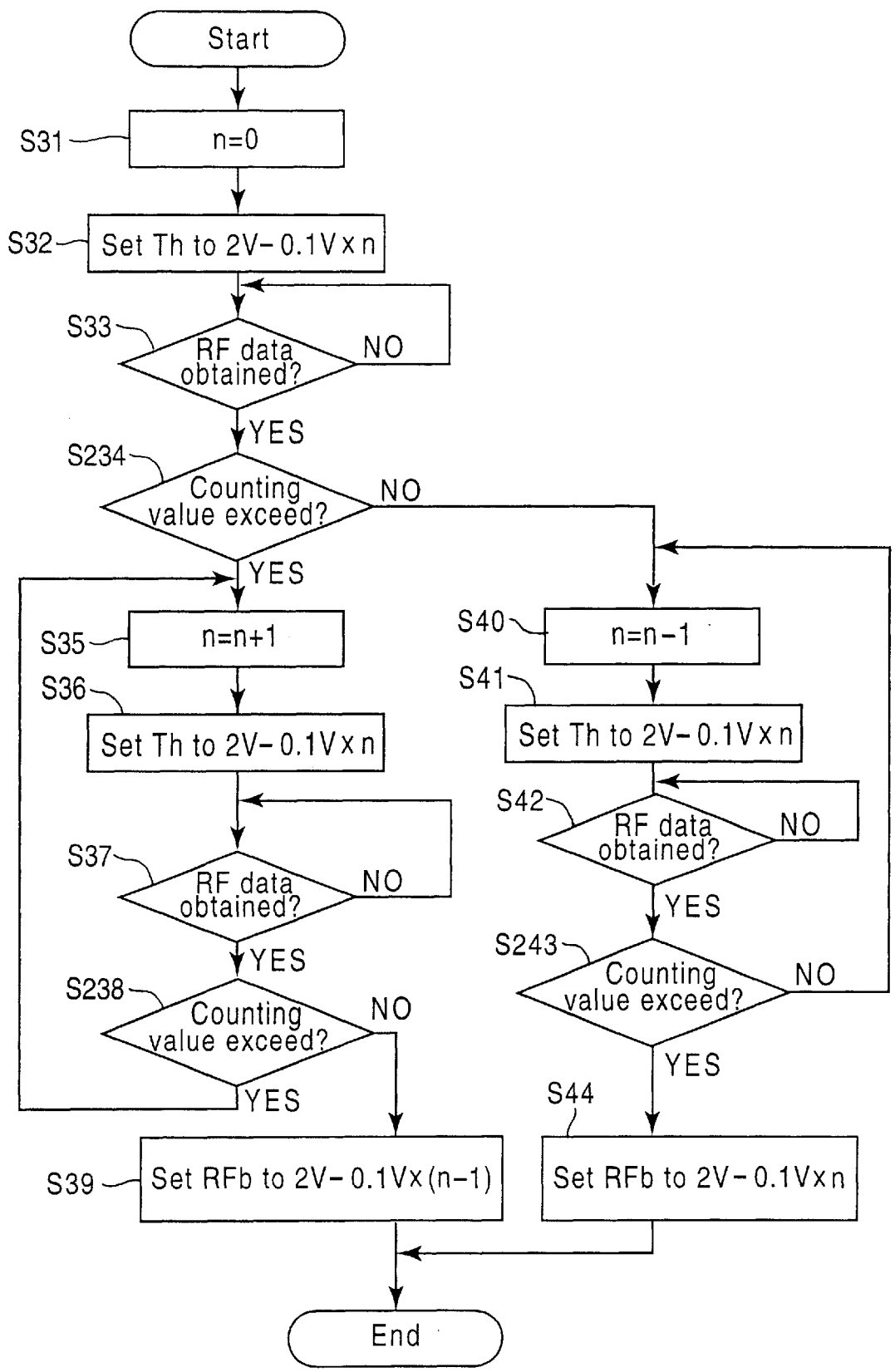
FIG. 10 shows a flow chart of depicting a process of discriminating a lower limit level according to the second embodiment of the present invention.

FIG. 10 is a flow chart of depicting a process of discriminating a lower limit level according to the second embodiment of the present invention.

Figure 8A:
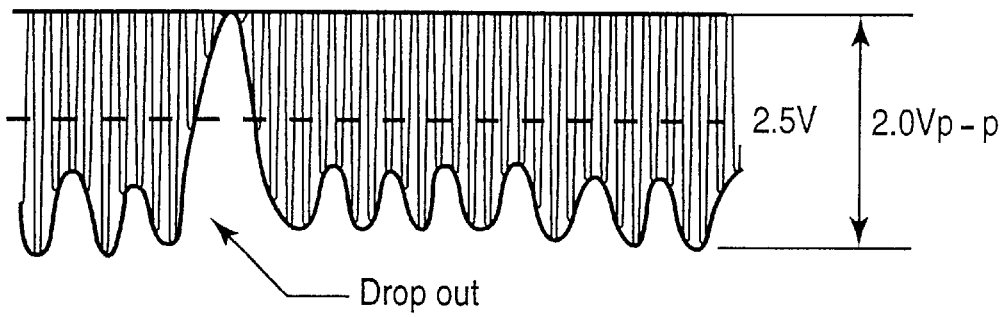
FIG. 8(*a*) shows a waveform of RF signal when a tracking servo is in an open state in a reading apparatus according to a second embodiment of the present invention.
Figure 8B:
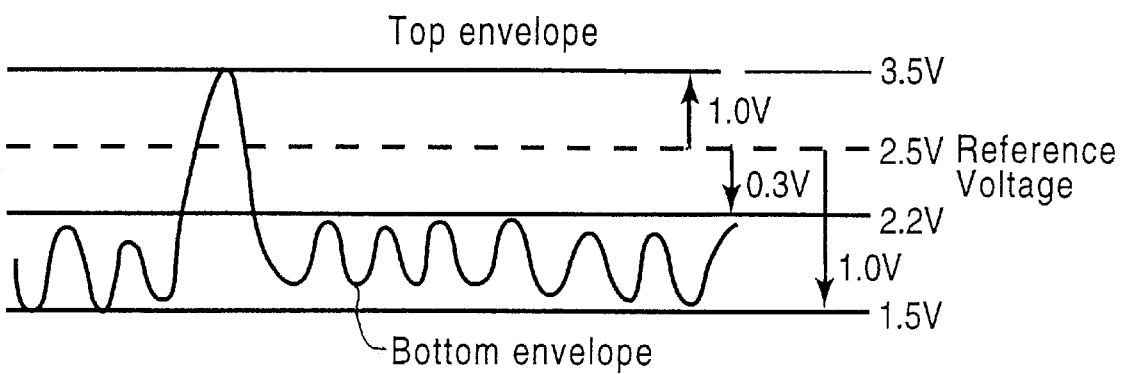

In an RF signal read out from a disc when a tracking servo is set to an open state, drop out of a signal may happen because of a scratch and a like on the disc as shown in FIG. 8(a). In this case, it is impossible to count accurately a number of tracks by the process disclosed in the first embodiment. A top envelope signal, which is called hereinafter a top component, and a bottom envelope signal, which is called hereinafter a bottom component, of an RF signal are produced by the TOP (top detector) 17 and the BOTTOM (bottom detector) 18 respectively as shown in FIG. 8(b). In case that a reference voltage of a signal inputted to the preamplifier 4 is 2.5V and an average value of an RF signal produced by the preamplifier 4 is equal to the reference voltage, 2.5V, the top component is approximately 3.5V and the bottom component is approximately 1.5V as shown in FIG. 8(b) as long as a time constant holding these components is fast. In case that the reference voltage is assumed to be 0V, the top component becomes approximately 1.0V and the bottom component becomes approximately−1.0V. In other words, the top component is higher than the reference voltage of 2.5V by 1.0V and the bottom component is lower than the reference voltage of 2.5V by 1.0V.

Figure 8C:
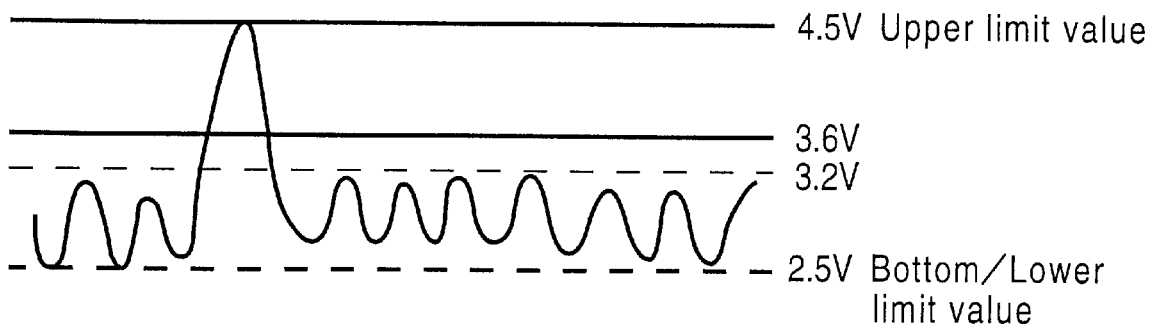

When the adder 19 obtains a sum of the top component and the bottom component, a summed signal, that is, an added signal is as follows, as shown in FIG. 8(c).

Upper limit value=(3.5−2.5)+(3.5−2.5)=2.0[V], where the value of 2.0V is a relative value based upon the reference voltage of 2.5V. In other words, the upper limit value is higher than the reference voltage of 2.5V by 2.0V; that is, the upper limit value is 4.5V.

Lower limit value=(3.5−2.5)+(1.5−2.5)=0[V], where the value of 0V is a relative value based upon the reference voltage of 2.5V, that is, the lower limit value is equivalent to the reference voltage of 2.5V. Amplitude of the added signal is from 2.0V to 0V if the reference voltage of 2.5V is assumed to be 0V. Accordingly, track counting can not be performed accurately if a waveform for track counting is counted by a slice level from 2.0V to 0V, that is, an average slice level of 1.0V. In other words, the track counting can not be performed accurately if the waveform for track counting is sliced by the slice level of 3.5V, which is higher than the reference voltage of 2.5V by 1.0V, that is, the average slice level of 1.0V, although this relation is not shown. On the other hand, in case of FIG. 8(d), track counting is accurately performed. For further details of FIG. 8(d) will be depicted in the following sections.

A method of performing accurate track counting with obtaining correct slice level is depicted in FIGS. 9 and 10. Theses FIGS. 9 and 10 show details of processes of discriminating upper limit and lower limit shown in FIG. 5. In FIG. 9, steps S214, S218, and S223 are different from steps S14, S18, and S23 shown in FIG. 6 respectively, and other steps and processes are the same as those of the first embodiment shown in FIG. 6. In the first embodiment as shown in FIG. 6, with respect to an upper limit level RFt, an initial value of 3V, for instance, is set in the COUNT (track count section) 120 as a slice level Th, then the slice level is increased or decreased in the step S15 and subsequent steps or S20 and subsequent steps in response to a process of judging whether or not a counting value exists in the step S14, and finally the upper limit value RFt is decided if no counting value exists in the step S18 or S23. On the other hand, in a second embodiment of the present invention, as for an upper limit level RFt, an initial value of 3V is set in the COUNT 120 as a slice level Th, then the slice level is increased or decreased in the step S15 and subsequent steps or S20 and subsequent steps in response to a process of judging whether or not a counting value exceeds a predetermined value in the step S214, and finally the upper limit value RFt is decided if a counting value is less than a predetermined value in the step S218 or S223.

Figure 8D:
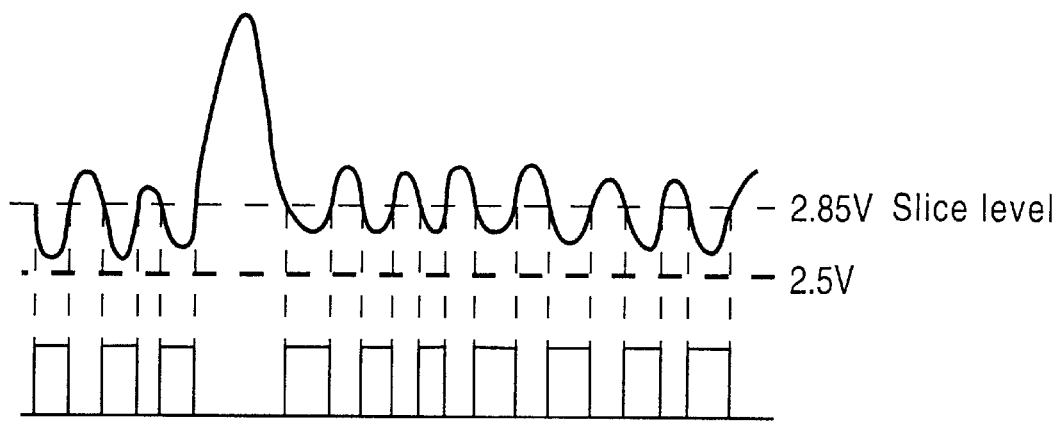

In FIG. 10, steps S234, S238, and S243 are different from steps S34, S38, and S43 shown in FIG. 7 respectively, and other steps and processes are the same as those of the first embodiment shown in FIG. 7. In the first embodiment as shown in FIG. 7, with respect to a lower limit level RFb, for example, an initial value of 2V is set in the COUNT 120 as a slice level Th, then the slice level is increased or decreased in the step S35 and subsequent steps or S40 and subsequent steps in response to a process of judging whether or not a counting value exists in the step S34, and finally the lower limit value RFb is decided if no counting value exists in the step S38 or S43. On the other hand, in a second embodiment of the present invention, as for a lower limit level RFb, an initial value of 2V, for instance, is set in the COUNT 120 as a slice level Th, then the slice level is increased or decreased in a step S35 and subsequent steps or S40 and subsequent steps in response to a process of judging whether or not a counting value exceeds a predetermined value in the step S234, and finally the lower limit value RFb is decided if a counting value is less than a predetermined value in the step S238 or S243. According to the method mentioned above, since a counting value is equal to one even though a drop out portion of a signal is sliced by 3.6V as shown in FIG. 8(c), the counting value is not recognized as exceeding a predetermined value in the step S214 and the slice level is decreased in the step S20 and subsequent steps. Accordingly, an upper limit level of 3.2V and a lower limit level of 2.5V are obtained as shown in FIG. 8(c) and a slice level for counting becomes 0.35V, which is an average value of 3.2−2.5=0.7. In other words, a signal for counting is sliced by a slice level of 2.85V, which is higher than the reference level of 2.5V by 0.35V as shown in FIG. 8(d). Accordingly, the track counting is accurately performed as shown in FIG. 8(d).

Third Embodiment

Figure 11:
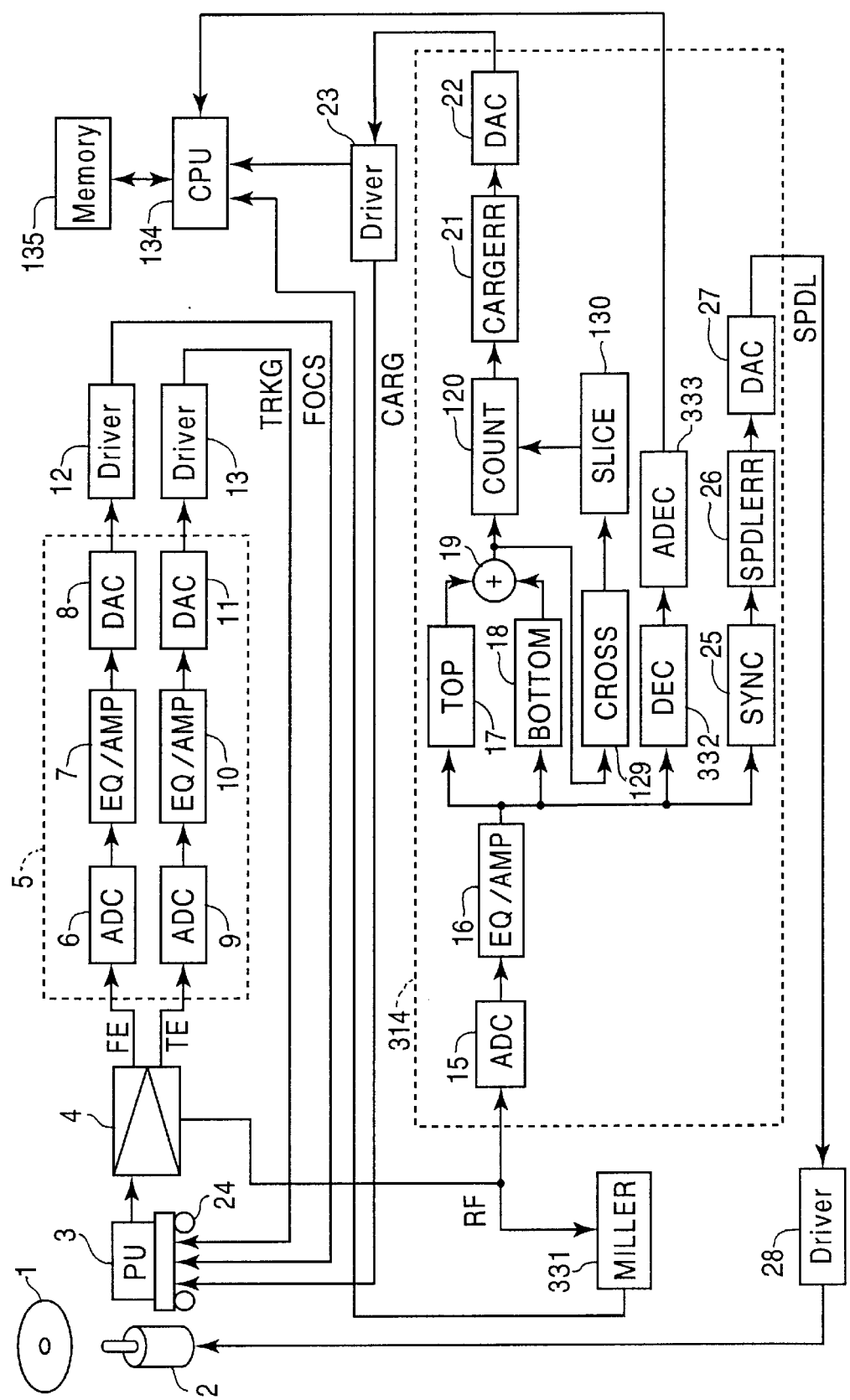
FIG. 11 shows a block diagram of a reading apparatus according to a third embodiment of the present invention.

FIG. 11 is a block diagram of a reading apparatus according to a third embodiment of the present invention.

Figure 12:
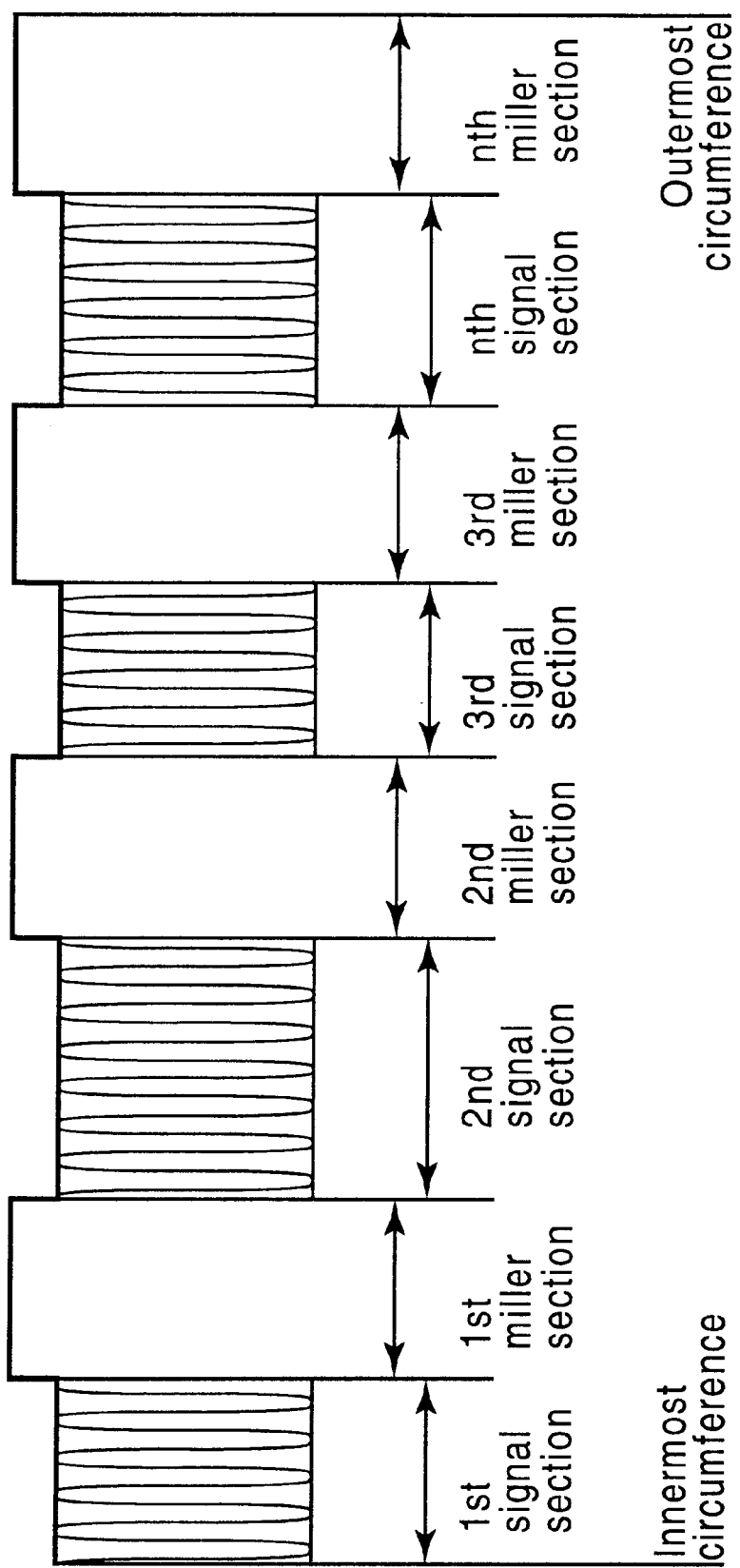
FIG. 12 shows a waveform of an RF signal when a tracking servo is in an open state in the reading apparatus shown in FIG. 11 according to the third embodiment of the present invention.

FIG. 12 is a waveform of an RF signal when a tracking (TRKG) is open circuited in the reading apparatus shown in FIG. 11 according to the third embodiment of the present invention.

Figure 13:
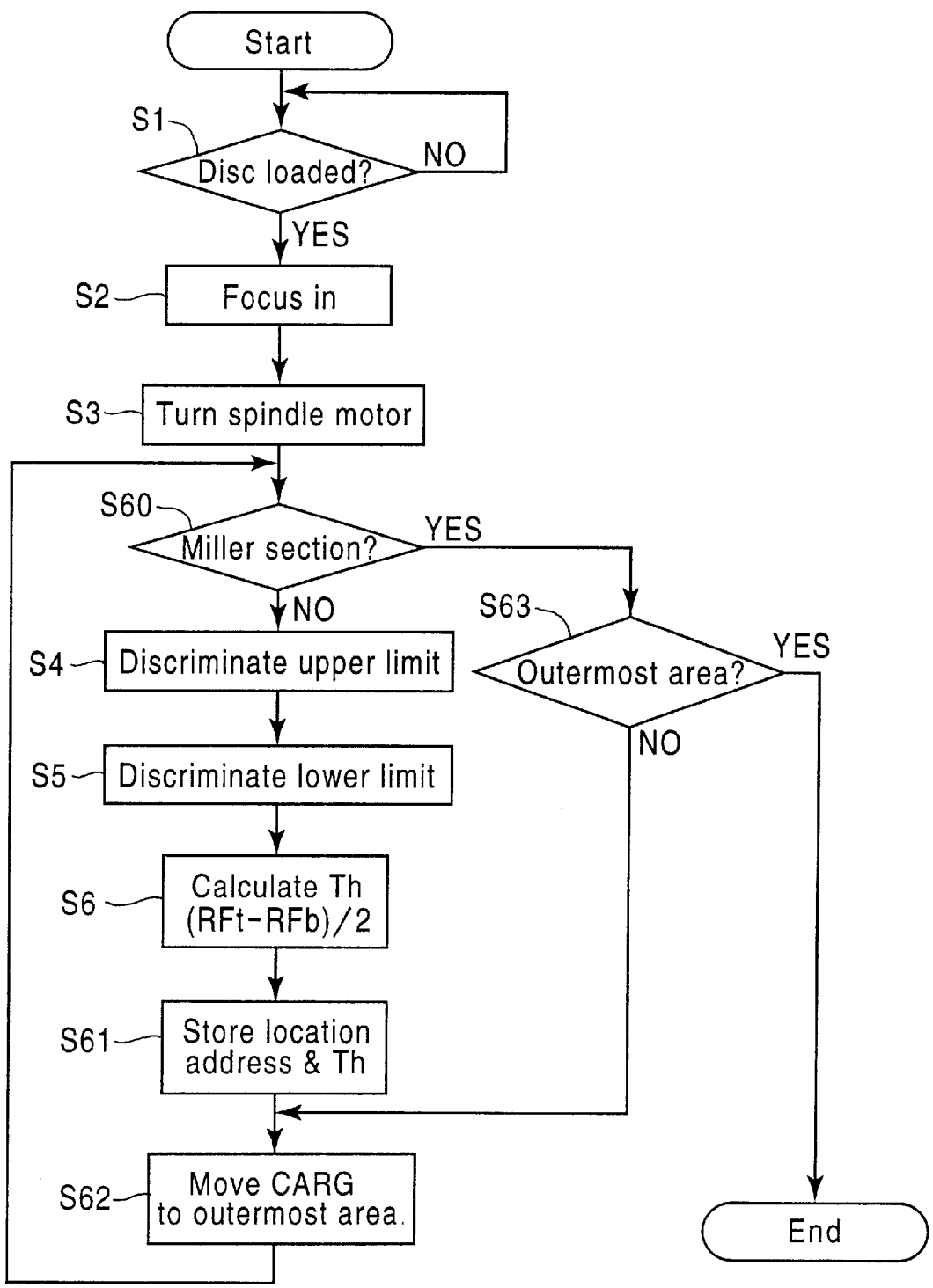
FIG. 13 shows a flow chart of explaining a process in the reading apparatus shown in FIG. 11 according to the third embodiment of the present invention.

FIG. 13 is a flow chart of depicting a process in the reading apparatus shown in FIG. 11 according to the third embodiment of the present invention.

As shown in FIG. 11, a reading apparatus according to the third embodiment of the present invention further comprises a miller section detector (MILLER) 331, a signal decoder (DEC) 332, and an address decoder (ADEC) 333 in addition to the reading apparatus of the first embodiment shown in FIG. 3. A signal level of a waveform, which is read out from an optical disc 1 such as a CD-R (Compact Disc Recordable) written with a plurality of data several times sequentially along a radial direction from an innermost area to an outermost area, is maximum at a miller section or non recorded section and becomes an RF signal having the aforementioned top and bottom components at a signal section as shown in FIG. 12. These configurations are repeated in every miller section and signal section. For example, in FIG. 12, a left hand side signal section is a first signal section allocated at the innermost area of the disc in response to a first time recording, and a next signal section following a first miller section subsequent to the first signal section is a second signal section in response to a second time recording, and finally a nth signal section is written in the outermost area just before a nth miller section in response to a nth time recording. A signal section is produced in accordance with a number of recordings. Referring back to FIG. 11, the MILLER (miller section detector) 331 detects whether or not an area is a miller section in accordance with an RF signal from the preamplifier 4 and a detected signal is transferred to the CPU 134. An address is decoded from RF data included in the RF signal so as to detect a location address of a signal recorded in the disc 1. Each slice level Th of a plurality of signal section areas is stored by transferring the address to the CPU 134 and the slice level Th is set in the COUNT (track counting section) 120 while image searching.

Operation in the reading apparatus of the third embodiment of the present invention is depicted in FIG. 13. It is confirmed whether or not a disc 1 is loaded (step S1) as same procedure as that of the first or second embodiment as shown in FIG. 5. In case that the disc 1 is loaded, a focus servo is set to a close state so as to focalize a light beam of the PU 3 to the disc 1 (step S2), then the spindle motor 2 is rotated by way of the driver 28 so as to rotate the disc 1 (step S3).

It is judged whether or not an area read out is a miller section (step S60). In case that the area is a signal section not a miller section, an upper limit level RFb of a slice level is discriminated (step S4) as depicted in the FIGS. 6 and 9. A lower limit level RFb of the slice level is discriminated (step S5) as depicted in FIGS. 7 and 10, the slice level Th is calculated by a following equation (step S6):

$$Th=(RFt-RFb)/2$$

A location address in the disc 1, which is detected by the DEC 332 and the ADEC 333 from the RF data processed by the ADC 15 and the EQ/AMP 16, and the above mentioned slice level Th, which is detected from the driver 23 for carriage driving, are respectively stored in the memory 135 (step S61). A carriage (CARG), not shown, is driven to an outermost direction (step S63), then the process returns back to the step S60. In case that a miller section is detected in the step S60, it is judged whether or not the miller section is allocated at an outermost area (step S63). If the miller section is not at an outermost area, the process is forwarded to the step S62 and the carriage is sifted to the outer most area, then the above mentioned process is repeated for each signal area. The process finally comes to end when a miller section is judged that it reaches to the outermost area in the step S63.

Fourth Embodiment

Figure 14:
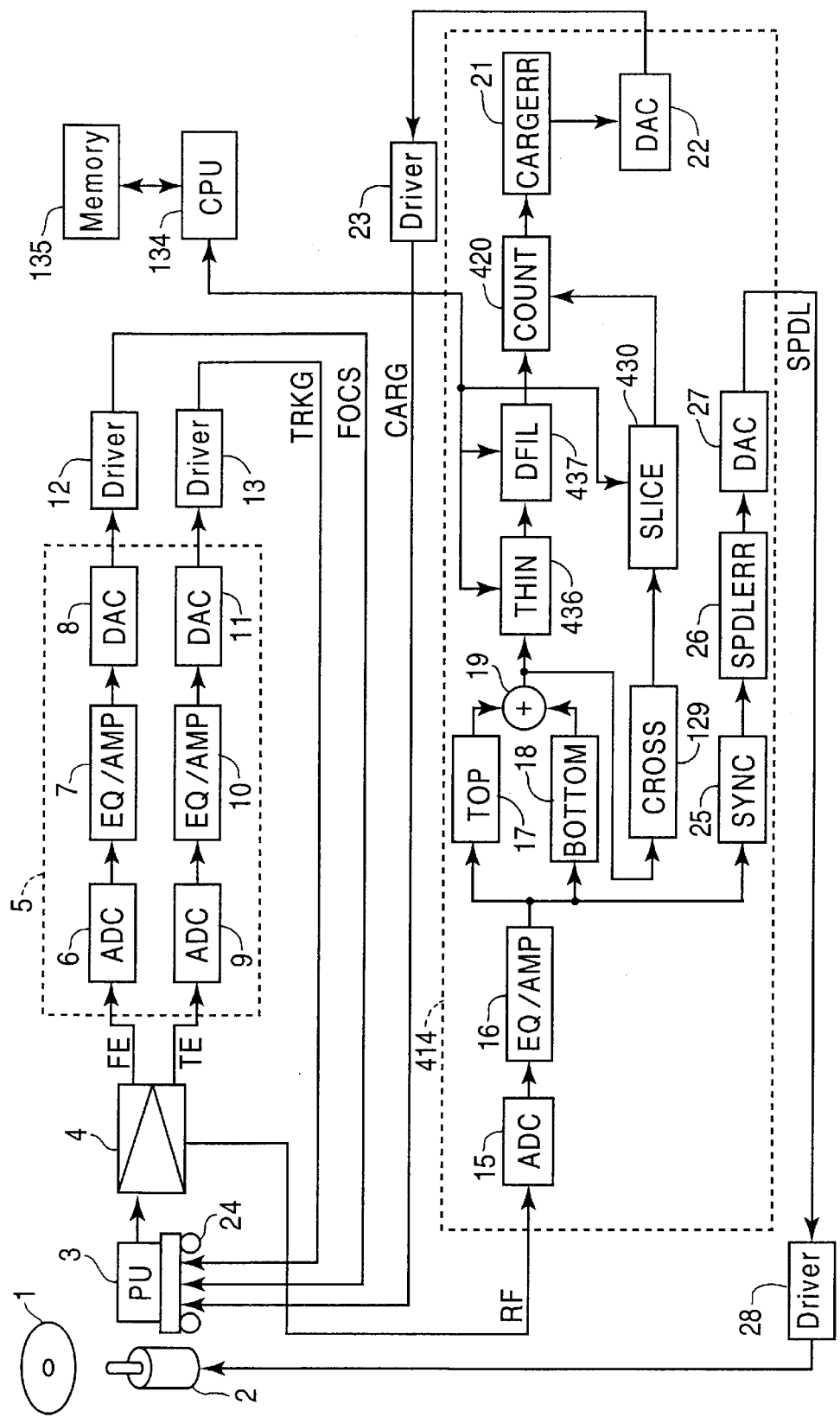
FIG. 14 shows a block diagram of a reading apparatus according to a fourth embodiment of the present invention.

FIG. 14 is a block diagram of a reading apparatus according to a fourth embodiment of the present invention.

Figure 15A:
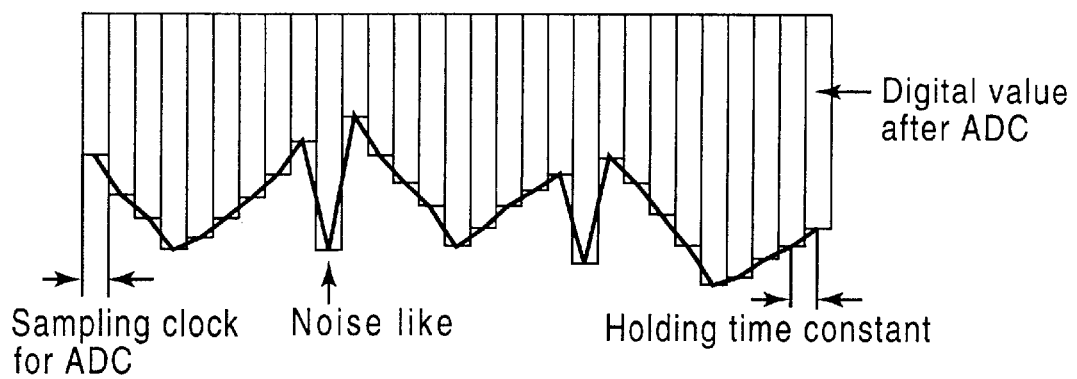
FIG. 15(a) shows a waveform of an RF signal with a fast time constant while sampling and holding the RF signal according to the fourth embodiment of the present invention.
Figure 15B:
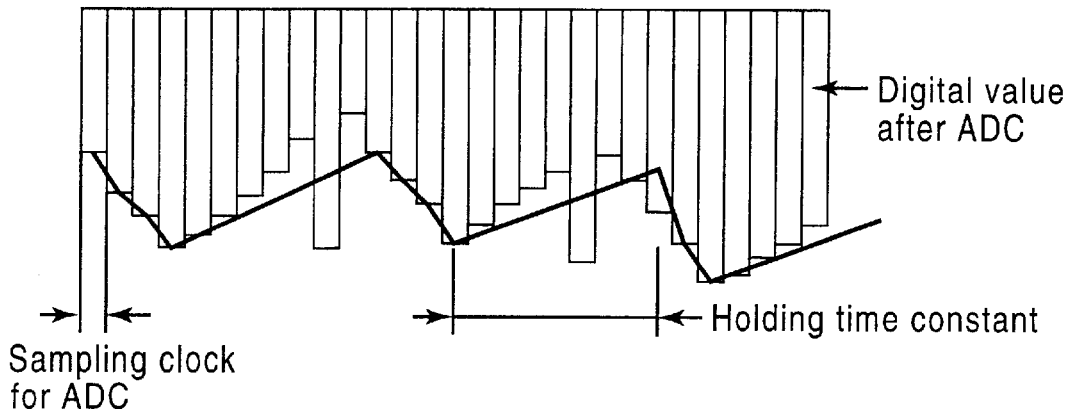
FIG. 15(b) shows a waveform of an RF signal with a slow time constant while sampling and holding the RF signal according to the fourth embodiment of the present invention.
Figure 15C:
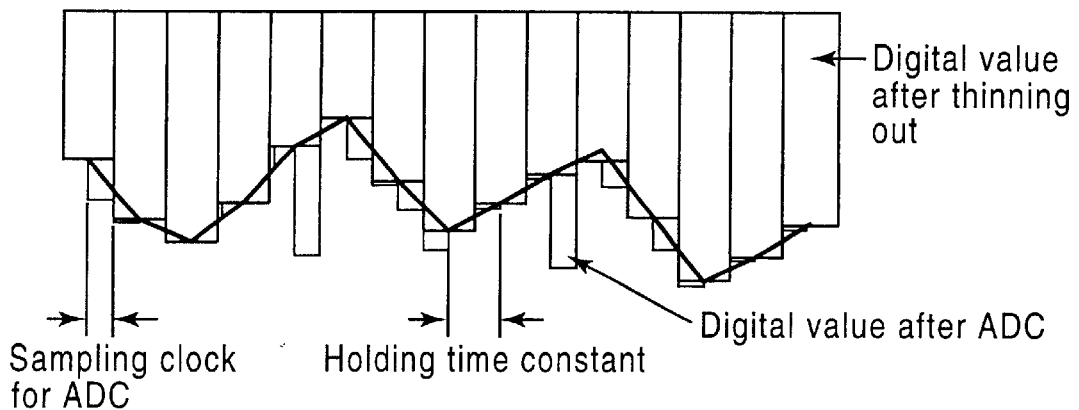
FIG. 15(c) shows a waveform of an RF signal after some components the RF signal are thinned out according to the fourth embodiment of the present invention.

FIGS. 15(a) through 15(c) are waveforms of an RF signal according to the fourth embodiment of the present invention.

As shown in FIG. 14, a reading apparatus according to the fourth embodiment further comprises a thinning out circuit (THIN) 436 and a digital filter (DFIL) 437 in a decoder 414 in comparison with the reading apparatus of the first embodiment shown in FIG. 3. It is necessary to sample and hold an RF signal by an appropriate time constant in order to extract a top and a bottom components of the RF signal. Since RF components of a CD are composed of signal components of 3T through 11T, an amplitude component of cross talk of the RF signal can be extracted as long as a time constant is fast as shown in FIG. 15(a), in other words, a sampling frequency fs is high. However, in case that an RF waveform includes some irregularity, components of irregularity are also extracted in fidelity since the extracted components of irregularity behave like noise on a envelope as shown in FIG. 15(a). If a time constant for sampling and holding an RF signal is set to slow in order to prevent this kind of noise as shown in FIG. 15(b), cross talk components can not be extracted while high speed image searching. Therefore, track counting can not be accurately performed.

According to the aspect of the fourth embodiment of the present invention, if a signal from the adder 19 is sampled once again with 1/m sampling frequency of the ADC (analog to digital converter) 15 by the THIN (thinning out circuit) 436, (m−1) pieces of RF data are thinned out. Noise components due to irregularity as shown in FIG. 15(a) are eliminated from the thinned out data by using the DFIL (digital filter) 437 as a low pass filter (LPF), then components necessary for track counting are transferred to the COUNT 420. FIG. 15(c) shows an exemplary waveform sampled by ½ sampling frequency of the ADC 15. In other words, every other digital value after analog to digital conversion is thinned out, so that a number of digital values after thinned out is a half of the initial quantity of digital values.

In case of thinning out RF data, noise may still remain in thinned out data for track counting or track counting can not be performed accurately due to excessive thinning out unless otherwise a rate of thinning out is changed in accordance with a condition such as a rotation speed of a disc 1 when reproducing, reading out data or not, or a maximum searching speed. Accordingly, the CPU 134 can eliminate the above mentioned problem by changing a frequency of re-sampling clock of the THIN 436 and a cut off frequency of the DFIL 437 in accordance with the above mentioned conditions. The DFIL 437, that is, the LPF is arranged in a subsequent stage of the THIN 436. However, they can be arranged in reverse. In addition thereto, an added signal outputted from the adder 19 is supplied to a COUNT (track counting section) 420 and the CROSS (cross talk detector) 129. However, a subtracter can be provided instead of the adder 19 and a subtracted signal from the subtracter can be supplied to the COUNT 420 and the CROSS 129.

According to the aspect of the present invention, track counting can be accurately performed although cross talk of an RF signal is fluctuated when tracks are counted in accordance with an RF signal read out from a signal recording area of an optical recording medium while image searching and a predetermined slice level, since the slice level is calculated, stored and set in accordance with a cross talk value of the RF signal.

What is claimed is:

1. A reading apparatus for an optical recording medium comprising:

track counting means for counting a number of signals crossing a slice level as a number of tracks, wherein the signals are an added signal or a subtracted signal of a top envelope and a bottom envelope of an RF signal read out from a signal recording area of the optical recording medium while image searching; and slice level calculating means for detecting an upper limit level and a lower limit level of the added signal or the subtracted signal obtained by scanning a circumference direction of the signal recording area, for holding the upper limit level and the lower limit level of the added signal or the subtracted signal detected, and for calculating an average of the upper limit level and the lower limit level as the slice level, wherein said slice level calculating means are characterized by supplying said upper limit level of the added signal or the subtracted signal to said track counting means as an upper limit of a slice level and determining said upper limit level by measuring said upper limit level in response to a result of counting by said track counting means, and further characterized by supplying said lower limit level of the added signal or the subtracted signal to said track counting means as a lower limit of a slice level and determining said lower limit level by measuring said lower limit level in response to a result of counting by said track counting means and calculating said slice level.

2. A reading apparatus for an optical recording medium in accordance with claim 1, wherein said slice level calculating means further comprises:

a first storing step of storing a first counting value in a predetermined period when said added signal or subtracted signal reaches to a first slice level;

a first comparing step of comparing said first counting value with a reference value predetermined;

a second storing step of storing a second counting value in a predetermined period when said first counting value reaches to a second slice level lower than the first slice level, in case that said first counting value does not reach to said reference value;

a second comparing step of comparing said second counting value with predetermined said reference value;

a lowering step of lowering a slice level until a counting value in a predetermined period becomes said reference value;

a third storing step of storing a third counting value in a predetermined period when said first counting value reaches to a third slice level higher than said first slice level, in case that said first counting value reaches to said reference value; and a raising step of raising a slice level until a counting value in a predetermined period decreases less than said reference value, said slice level calculating means further characterized by that a slice level of which a counting value in a predetermined period exceeds said reference value is determined by each step as an upper limit of the slice level.

3. A reading apparatus for an optical recording medium in accordance with claim 1, wherein said slice level calculating means comprises:

a first storing step of storing a first counting value in a predetermined period when said added signal or subtracted signal reaches to a first slice level;

a first comparing step of comparing said first counting value with a reference value predetermined;

a second storing step of storing a second counting value in a predetermined period when said first counting value reaches to a second slice level lower than the first slice level, in case that said first counting value does not reach to said reference value;

a second comparing step of comparing said second counting value with predetermined said reference value;

a lowering step of lowering a slice level until a counting value in a predetermined period becomes said reference value;

a third storing step of storing a third counting value in a predetermined period when said first counting value reaches to a third slice level higher than said first slice level, in case that said first counting value reaches to said reference value; and a raising step of raising a slice level until a counting value in a predetermined period decreases less than said reference value, said slice level calculating means further characterized by that a slice level of which a counting value in a predetermined period exceeds said reference value is determined by each step as a lower limit of the slice level.

4. A reading apparatus for an optical recording medium in accordance with claim 1, wherein said track counting means are further characterized by that track counting is performed by slicing a signal, which is processed by at least one of thinning out said added or subtracted signal or filtering low frequency components, by a predetermined slice level calculated by said slice level calculating means.

5. A reading apparatus for an optical recording medium comprising:

track counting means for counting a number of signals crossing a slice level as a number of tracks, wherein the signals are an added signal or a subtracted signal of a top envelope and a bottom envelope of an RF signal read out from a signal recording area of the optical recording medium while image searching; and slice level calculating means for detecting an upper limit level and a lower limit level of the added signal or the subtracted signal obtained by scanning a circumference direction of the signal recording area, for holding the upper limit level and the lower limit level of the added signal or the subtracted signal detected, and for calculating an average of the upper limit level and the lower limit level as the slice level;

wherein said track counting means are further characterized by a configuration that a degree of thinning out said added or subtracted signal is changed, or a cut off frequency is changed in response to noise of an RF signal read out from a signal recording area of an optical recording medium.

6. A reading apparatus for an optical recording medium in accordance with claim 1, wherein said slice level calculating means are further characterized by that a slice level is calculated by each signal area with discriminating a plurality of said signal recording areas by each miller area and stored, and that a slice level is set in said track counting means at each time when each signal area is searched.

7. A reading apparatus for an optical recording medium in accordance with claim 1, wherein said slice level calculating means are further characterized by that a slice level is calculated by each optical recording medium with discriminating an optical recording medium and stored, and that the slice level is set in said track counting means at each time when each optical recording disc is searched.

* * * * *